(12) United States Patent
Zoualfaghari et al.

(10) Patent No.: US 12,726,415 B2
(45) Date of Patent: Sep. 1, 2026

(54) METHOD FOR MONITORING A COMPUTATIONAL SYSTEM

(71) Applicant: BRITISH TELECOMMUNICATIONS PUBLIC LIMITED COMPANY, London (GB)

(72) Inventors: Mohammadhossein Zoualfaghari, London (GB); Nektarios Georgalas, London (GB); Andrew Reeves, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 346 days.

(21) Appl. No.: 17/915,404

(22) PCT Filed: Mar. 1, 2021

(86) PCT No.: PCT/EP2021/055084
§ 371 (c)(1),
(2) Date: Sep. 28, 2022

(87) PCT Pub. No.: WO2021/197738
PCT Pub. Date: Oct. 7, 2021

(65) Prior Publication Data

US 2023/0132802 A1 May 4, 2023

(30) Foreign Application Priority Data

Mar. 31, 2020 (GB) ...................................... 2004674

(51) Int. Cl.
*H04L 41/5009* (2022.01)
*G06F 9/48* (2006.01)
*G06F 11/34* (2006.01)

(52) U.S. Cl.
CPC ........ *H04L 41/5009* (2013.01); *G06F 9/4881* (2013.01); *G06F 11/3419* (2013.01)

(58) Field of Classification Search
CPC ........................... G06F 11/3419; G06F 9/4881
See application file for complete search history.

(56) References Cited

U.S. PATENT DOCUMENTS 8,108,724 B2 1/2012 Barlow et al.
8,132,180 B2 3/2012 Agarwal et al.
(Continued)

FOREIGN PATENT DOCUMENTS

CN 100377532 3/2008
CN 102819259 12/2012
(Continued)

OTHER PUBLICATIONS

GB Combined Search and Examination Report for GB 2004674.4 dated Dec. 11, 2020 (11 pages).
(Continued)

*Primary Examiner* — James R Sheleheda
(74) *Attorney, Agent, or Firm* — Nixon & Vanderhye P.C.

(57) ABSTRACT

A computer-implemented method (300) of monitoring a computational system (100), said computational system comprising a plurality of interoperating computing components (210) for performing computational operations thereby to provide a computational service to a user (120), wherein said computational system comprises a plurality of performance requirements based on at least one performance attribute, the method comprising the steps of: selecting a performance attribute associated with a performance requirement of the computational system (310); identifying a set of computing components from the plurality of computing components, wherein each of the computing components in the set perform operations affecting the selected
(Continued)

performance attribute (320); determining a mapping of relationships for the computing components in the identified set in relation to the selected performance attribute; retrieving a performance status of a computing component in the identified set (320); and in dependence on said determined mapping and said retrieved performance status, calculating a probability of the identified set complying with the performance requirement for the selected performance attribute (340).

20 Claims, 4 Drawing Sheets

(56) References Cited

U.S. PATENT DOCUMENTS

| | | | | |
|---|---|---|---|---|
| 8,161,058 | B2 * | 4/2012 | Agarwal | G06F 11/008 707/758 |
| 8,769,339 | B2 | 7/2014 | Sonoda et al. | |
| 8,862,927 | B2 | 10/2014 | Bhalerao et al. | |
| 9,338,065 | B2 * | 5/2016 | Vasseur | H04L 47/2425 |
| 9,418,088 | B1 | 8/2016 | Noll | |
| 9,860,317 | B1 * | 1/2018 | Gupta | H04L 67/1097 |
| 10,831,585 | B2 * | 11/2020 | Gu | G06N 20/00 |
| 2003/0093527 | A1 * | 5/2003 | Rolia | H04L 67/1008 709/226 |
| 2004/0153563 | A1 * | 8/2004 | Shay | H04L 41/5025 709/232 |
| 2005/0188075 | A1 * | 8/2005 | Dias | H04L 67/61 709/224 |
| 2006/0188011 | A1 * | 8/2006 | Goldszmidt | G06Q 10/04 375/229 |
| 2006/0293777 | A1 * | 12/2006 | Breitgand | H04L 43/16 700/108 |
| 2009/0177692 | A1 | 7/2009 | Chagoly et al. | |
| 2010/0223217 | A1 * | 9/2010 | Little | G06F 9/5088 709/224 |
| 2011/0087522 | A1 * | 4/2011 | Beaty | G06Q 10/063 705/308 |
| 2011/0231582 | A1 * | 9/2011 | Uysal | G06F 11/008 710/15 |
| 2011/0296249 | A1 * | 12/2011 | Merchant | G06F 11/3428 714/E11.062 |
| 2015/0134823 | A1 * | 5/2015 | Cucinotta | H04L 47/2425 709/226 |
| 2015/0156081 | A1 * | 6/2015 | Chakra | H04L 41/5006 709/224 |
| 2015/0195212 | A1 * | 7/2015 | Vasseur | H04L 45/02 370/252 |
| 2016/0359683 | A1 * | 12/2016 | Bartfai-Walcott | H04L 41/40 |
| 2019/0324831 | A1 * | 10/2019 | Gu | G06F 11/0775 |
| 2021/0224173 | A1 * | 7/2021 | Roest | G06F 11/3466 |
| 2023/0132802 | A1 * | 5/2023 | Zoualfaghari | H04L 41/0631 702/182 |
| 2024/0020436 | A1 * | 1/2024 | Cantrell | G06F 30/20 |
| 2024/0330096 | A1 * | 10/2024 | Jha | G06F 11/3089 |

FOREIGN PATENT DOCUMENTS

| | | |
|---|---|---|
| EP | 2 669 799 | 12/2013 |
| JP | 2007094694 | 4/2007 |
| WO | 2015/103523 | 7/2015 |
| WO | 2016/122676 | 8/2016 |

OTHER PUBLICATIONS

Papamarkos, G. et al., "Event-Condition-Action Rule Languages for the Semantic Web" 2006, School of Computer Science and Information Systems, Birkbeck College, University of London (19 pages).
Extended European Search Report for 20167002.3 dated Sep. 8, 2020 (13 pages).
International Search Report and Written Opinion of the ISA for PCT/EP2021/055084 dated May 11, 2021 (12 pages).
Examination Report dated Jun. 25, 2024, issued for European Application No. 21 707 745.2 (6 pages).
Communication pursuant to Article 94(3) EPC dated Oct. 29, 2025, issued for European Application No. 21 707 745.2 (7 pages).

* cited by examiner

METHOD FOR MONITORING A COMPUTATIONAL SYSTEM

This application is the U.S. national phase of International Application No. PCT/EP2021/055084 filed Mar. 1, 2021 which designated the U.S. and claims priority to GB 2004674.4 filed Mar. 31, 2020, the entire contents of each of which are hereby incorporated by reference.

FIELD OF INVENTION

The present invention relates to a method of monitoring a computational system.

BACKGROUND

Computer systems may be configured in a highly complex manner to comprise many dynamically-interacting components (hardware or software) so as to allow a Service Provider (SP) to deliver a service to a user. For example, a computer system may comprise servers, routers, switches, gateways, firewalls, processors, controllers, power systems, orchestrators and databases, each of which interoperate in order to facilitate a cloud computing service to a user.

The SP may agree with a user a standard of service that is to be provided by the computer system, which typically commits the SP to provide a service that performs within certain performance bounds, and may include, for example: a maximum period of downtime in a given time period; a minimum level of security; a minimum bandwidth speed; a maximum query response time for accessing a database; and a maximum latency. The standard of service assured by the SP is typically codified in a so-called Service Level Agreement (SLA).

The ability of the SP to meet the SLA is dependent on the performance of the components of the computer system. However, beyond a point, the complexity of a computer system may overwhelm the ability for a SP (in particular, experienced human operators) reliably to predict how the many components may interact. This can result in unpredictable and undesirable behaviours of the computer system, which may in turn lead to the computer system underperforming the SLA, which may manifest as outages of the computer system, and in turn may lead to financial penalties, as well as reputational damage for the SP.

It is an aim of the present invention to alleviate at least some of the aforementioned problems.

STATEMENTS OF INVENTION

According to a first aspect of the present invention, there is provided a computer-implemented method of monitoring a computational system, said computational system comprising a plurality of interoperating computing components for performing computational operations thereby to provide a computational service to a user, wherein said computational system comprises a plurality of performance requirements based on at least one performance attribute, the method comprising the steps of: selecting a performance attribute associated with a performance requirement of the computational system; identifying a set of computing components from the plurality of computing components, wherein each of the computing components in the set perform operations affecting the selected performance attribute; determining a mapping of relationships for the computing components in the identified set in relation to the selected performance attribute; retrieving a performance status of a computing component in the identified set; and in dependence on (e.g. as a function of) said determined mapping and said retrieved performance status, calculating a probability of the identified set complying with the performance requirement for the selected performance attribute.

Preferably, said performance requirement is predefined. Optionally, the performance requirement is a requirement for a maximum and/or minimum value for at least one performance attribute. Preferably, the performance requirement is assessed over a predefined period of time. Preferably, the set is populated only by computing components that perform operations affecting the selected performance attribute. Preferably, said performance requirement is provided by a Service Level Agreement associated with the computational system. Preferably, said set is pre-defined or empirically populated. Optionally, the performance attribute is: bandwidth; latency; record processing time; number of security breaches; and service availability. Optionally, the performance status is: bandwidth; latency; record processing time; error rate; and/or processing load. Optionally, the computational system is in the form of: a data processing service; a telecommunications service; a file transfer service; a network security service; and/or a control system. Optionally, the computing components are in the form at least one of a: server; router; switch; firewall; processor; controller; power system; orchestrator; and/or database. Optionally, the computing components of the computing system form a distributed computing system. Preferably, the performance status is retrieved from a given computing component by means of a monitoring unit that forms part of said computing component. Preferably, the performance status relates to: a given computing component; an input directly received by said given computing component from another computing component; and/or an output generated by said given computing component. Optionally, the computational system is a computer simulation of a computational system.

Preferably, the probability is calculated in dependence on: a first distribution for an expected number of times that the identified set does not comply with the performance requirement within a predetermined time period; and a second distribution for an expected time required for the identified set to recover to a state that complies with the performance requirement having failed to comply with the performance requirement. Preferably, said predetermined time period is prescribed by the performance requirements. Preferably, the probability is calculated in dependence on individual first and/or second distributions for each computing component of the identified set.

Preferably, the probability is calculated in dependence on an expected total time in which the identified set does not comply with the performance requirement, and wherein said expected total time is an output from the second distribution based on an input of a sample value for an expected number of times that the identified set does not comply with the performance requirement from the first distribution.

Preferably, probability is calculated in dependence on a count of the number of times over a plurality of sample values from the first distribution when the expected total time exceeds an upper limit for a total time when the identified set does not comply with the performance requirement.

Preferably, the probability is calculated in dependence on the retrieved performance status by: comparing the retrieved performance status to a threshold performance status value; determining that the performance status is below the threshold performance status value and therefore subsequently designating the computing component as having no effect on the selected performance attribute; and wherein the probability is calculated as a conditional probability of the identified set complying with the performance requirement when said computing component is designated to have no effect on the selected performance attribute.

Preferably, the performance status is retrieved from each computing component of the identified set, and wherein said probability is calculated in dependence on the performance status from each computing component.

Preferably, determining the mapping of relationships within the set of computing components comprises determining a sequence in which operations are performed by the computing components, and more preferably, includes determining a direction of a relationship.

Preferably, the method further comprises the steps of: comparing the determined probability to a threshold probability value; outputting a determination that the computational system is likely to comply with the performance requirement when the determined probability exceeds the threshold probability value; and outputting a determination that the computational system is unlikely to comply with the performance requirement when the determined probability does not exceed the threshold probability value.

Preferably, the computational system is determined to be likely to comply with the performance requirement having designated the computing component to have no current effect on the selected performance attribute. Alternatively, the determination that the computational system is unlikely to comply with the performance requirement is output despite not designating any computing component within the identified set to have no current effect on the selected performance attribute.

Preferably, the method further comprises the step of reconfiguring at least one of the computing components within the identified set in response to outputting a determination that the computational system is unlikely to comply with the performance requirement.

Preferably, the method further comprises the step of reconfiguring at least one of the computing components within the identified set so as to decrease the probability of the identified set complying with the performance requirement. Preferably, said reconfiguring is performed only up to an extent in which the decrease in the probability exceeds a threshold probability for complying with the performance requirement. Alternatively, the step of reconfiguring at least one of the computing components within the identified set may be performed so as to increase the probability of the identified set complying with the performance requirement.

Preferably, the method further comprises the step of determining a relational weight value for each determined mapping of relationships, wherein the probability is calculated in dependence on said each relational weight value. Preferably, the probability is calculated from a product of one less than each said relational weight value.

Preferably, the relational weight value is calculated for a relationship between a first computing component and a second computing component, and wherein said relational weight value is derived from a probability that the second computing component is capable of ensuring compliance with the performance requirement in the event that the performance status of the first computing component is below a or the threshold performance status value. Preferably, the second computing component receives as a direct input an output from the first computing component. Preferably, the threshold performance status value level is defined by the performance requirement and/or is a state of inoperability of a computing component.

Preferably, the method further comprises the steps of: deriving an importance value for a computing component within the identified set, wherein said importance value is one less than a product of the relational weight values associated with that computing component; and calculating the probability in dependence on the importance value. Preferably, an importance value is calculated for each of the computing components within the identified set.

Preferably, the step of reconfiguring the at least one of the computing components is performed by selecting a computing component to reconfigure in dependence on its importance value. Preferably, said selecting is first performed for a computing component having the highest or lowest importance value.

Preferably, the method further comprises the step of repeating a method as described above for a further performance attribute and/or for a further performance requirement of the computational system.

According to another aspect of the invention, there is provided a computer-readable storage medium comprising instructions that, when executed by a processor associated with a computational system, causes the telecommunication network to perform a method as described above.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method as described herein and/or substantially as illustrated with reference to the accompanying drawings. The present invention is now described, purely by way of example, with reference to the accompanying diagrammatic drawings, in which.

SPECIFIC DESCRIPTION

Figure 1:
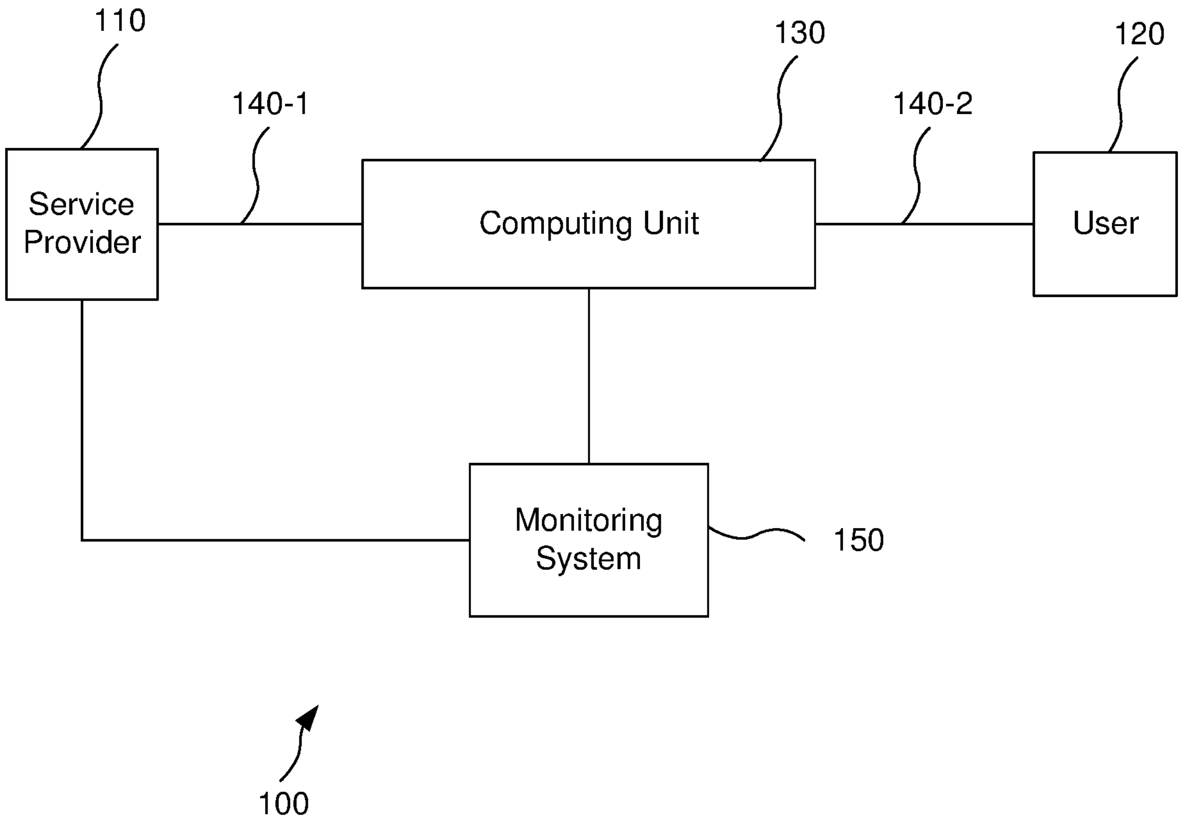
FIG. 1 shows an example of a computational system.

FIG. 1 shows an overview of a computational system 100 that is operated by a Service Provider (SP) 110 for the purpose of rendering a computational service to a user 120. In one example, the computational service is: a data processing service; a telecommunications service; a file transfer service; a network security service; and/or a control system.

The computational system 100 comprises a Computing Unit (CU) 130, which comprises at least one Computing Component (CC), for performing computational operations so as to provide the required computational service to the user 120.

The CU 130 is in communication with the SP, by means of a network connection 140-1, so as to permit configuration of the CU by the SP. The CU 130 is also in communication with the user, by means of a further network connection 140-2, so as to deliver the computational service (i.e. the output from the CU 130) to the user 120.

Upon initiation of the computational system 100, the SP configures the CU 130 to perform and to output the computational service that is sought by the user 120; this is performed, for example, by loading a configuration file to the CU 130.

The CU 130 is associated with a Monitoring System (MS) 150 that is configured to retrieve and to process performance information regarding the performance of the CU with which it is associated. Performance information is available to include computational and networking metrics (e.g. processing load, error rate, latency, bandwidth, etc.). The MS 150 is in communication with the SP 110 so as to report performance information and analysis of performance information to the SP.

Figure 2:
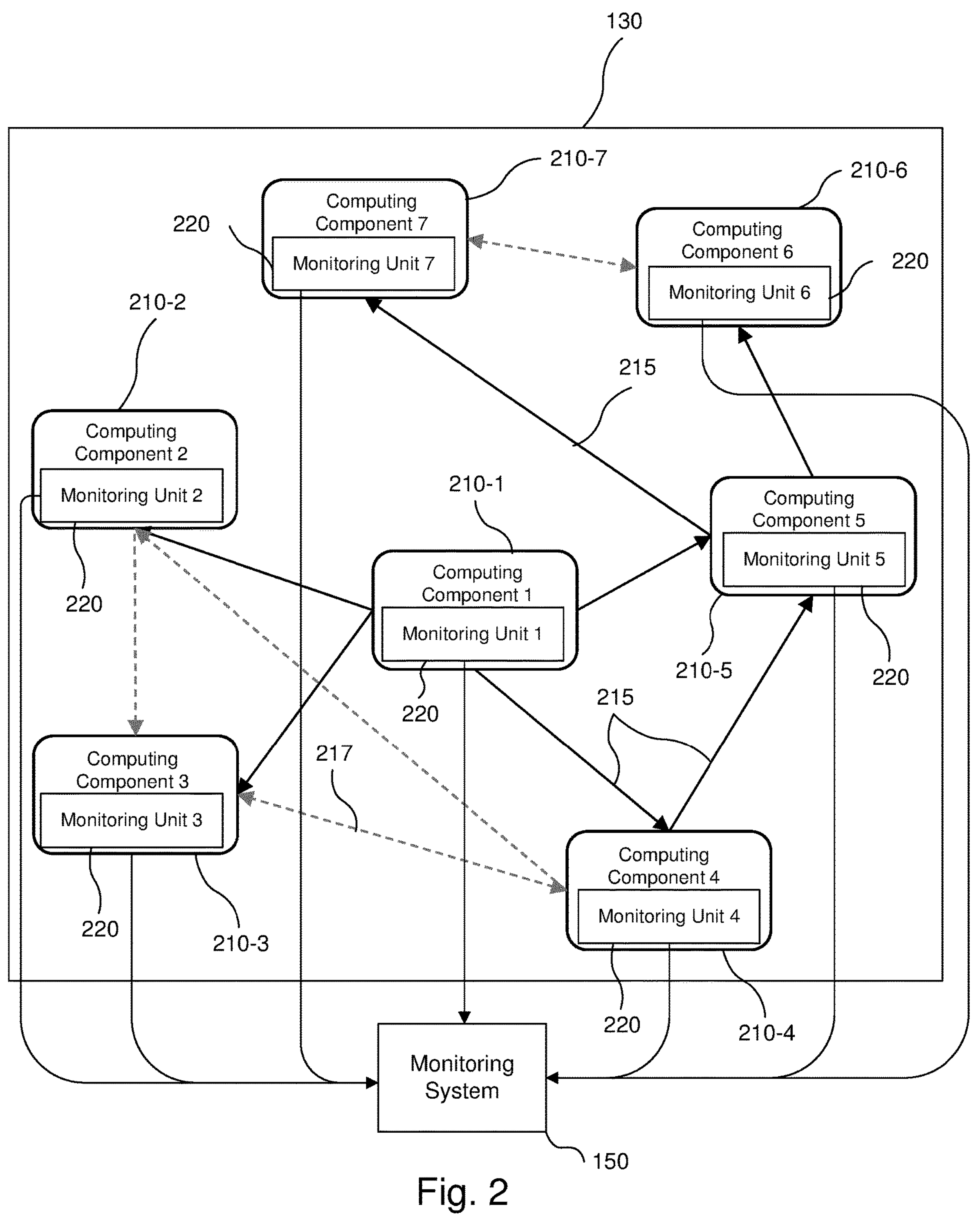
FIG. 2 shows a detailed view of an aspect of the computational system.

FIG. 2 is a detailed view of the CU 130. As best shown in FIG. 2, the CU 130 comprises a plurality of Computing Components (CCs) 210, each of which is configured to perform a computational operation so that the plurality of CCs deliver, in aggregate, the computational service to the user 120. This is achieved by way of a sequence of operations that are performed by the CCs.

In one example, the CCs are in the form of: a server; a router; a switch; a database; a processor; a computer program, software or virtualised computer hardware; a firewall; an orchestrator; a sensor; and/or a controller. For conciseness, FIG. 2 shows the CU 130 as having only seven CCs. However, the CU 130 is available to have any number of CCs, and it is typical for a CU to have hundreds, if not thousands, of CCs.

In turn, each CC 210 comprises a Monitoring Unit (MU) 220 for retrieving performance information from its associated CC. In turn, each MU reports the retrieved performance information (upon request or periodically) to the Monitoring System (MS) 150, which aggregates the performance information from each CC, and in turn performs analysis of this aggregated performance information.

Under a predefined set of rules, referred to as a Service Level Agreement (SLA), the SP 110 agrees to provide to the user 120 a computational service that meets predefined performance requirements relating to a plurality of performance attributes. Failure to provide the requested service to the user within the performance requirements of the SLA may constitute a breach of the SLA by the SP.

For example, a given performance attribute, $A_n$, is available to be: bandwidth; latency; record processing time; number of security breaches; and service availability. In turn, the corresponding performance requirements for such performance attributes are available to be, for example: a minimum bandwidth of 20 Mb; a maximum latency of 2 s; a mean record processing time of 1 s; a maximum number of security breaches; and a service availability of at least 90%.

FIG. 2 shows, for a given first performance attribute, $A_1$, the relationships between the CCs 210, shown by way of solid lines 215 in which arrows indicate the direction of the sequence in which the CCs operate (when performing operations that relate to $A_1$).

The operations performed by the CCs are available to be consequential to a plurality of performance attributes (i.e. not just $A_1$). For example, relationships for another performance attributes (i.e. not $A_1$) are alternatively shown via broken lines 217.

The relationships between the CCs are, for a given performance attribute, available to be one-way or two-way (as indicated by a single- or a double-arrowed line in FIG. 2, respectively). For simplicity, for performance attribute $A_1$, comprises only one-way relationships.

In more detail, for $A_1$, and as shown in FIG. 2, an output of a first CC 210-1 is provided as an input for a second 210-2, a third 210-3, a fourth 210-4 and a fifth 210-5 CC. In turn, the output of the fourth CC 210-4 is also provided as an input for the fifth CC 210-5. The output of the fifth CC 210-5 is provided as an input for a sixth 210-6 and a seventh 210-7 CC. The output of the seventh CC 210-7 is available to form part of the computational service delivered to the user 120 or to form an input of a computational operation in relation to another performance attribute.

The MS is provided so as to assess a likelihood that the CU will comply with each performance requirement, and therefore with the SLA.

Figure 3:
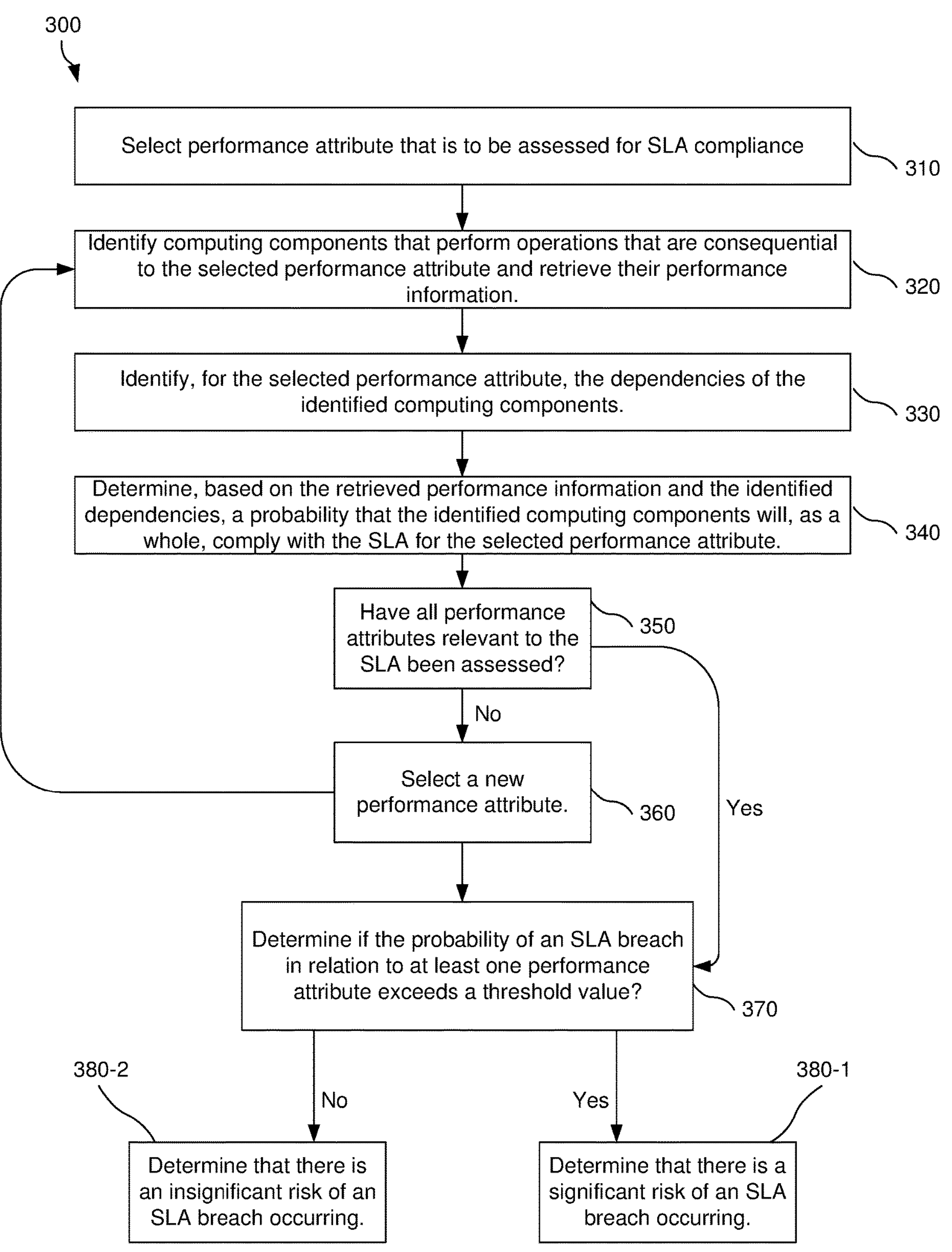
FIG. 3 is a process for monitoring the computational system.

FIG. 3 is a diagram showing a process 300 by which the MS determines a probability that the computing system will comply with the SLA.

In a first step 310, the MS selects a performance attribute that characterises a performance requirement of the SLA pertaining to the computer system 100, such as performance attribute $A_1$.

At a subsequent step 320, the MS 150 identifies the CCs that perform operations that are consequential to the selected performance attribute. At a next step 330, the MS identifies the dependencies between the identified CCs for the selected performance attribute. In this way, there is derived a mapping of relationships between the identified CCs such as that shown in, and described with reference to, FIG. 2. The information identified in steps 320 and 330 is available to be derived from information provided by the SP 110 and/or from historical information of performance information from each CC by each MU 220 from which the MS is configured to infer or deduce relationships amongst the CCs.

At a subsequent step 340, the MUs 220 report to the MS the current performance information of the CCs identified in step 330.

With the knowledge of the identified relationships between the CCs for the performance attribute selected in step 310 and the current performance information retrieved at step 320, the MS 150 is configured to perform processing so as to help determine a probability of an upcoming SLA breach. To do so, the MS performs probabilistic analysis, the underlying principles of which are described in more detail further below.

At a next step 350, an assessment is made as to whether preceding steps 310 to 340 have been performed for all performance attributes that define each of the performance requirements of the SLA. If so, the process 300 proceeds to step 370. If not, then the process 300 proceeds to select a new performance attribute at step 360, and the process reiterates to step 320.

Once the probability of an SLA breach has been determined for all constituent performance attributes of the SLA, an assessment is made as to whether any of the determined probabilities exceed a pre-determined threshold. If so, the process 300 outputs a result that there is a significant risk of an SLA breach 380-1, and if not, the process 300 outputs a result that there is an insignificant risk of an SLA breach 380-2; the consequences of these outputs are also discussed in more detail further below.

The analysis that is performed by the MS 150 so as to determine the probability of an SLA breach, as performed at step 340, is now described.

For simplicity, we first take a SLA that consists of a single performance requirement that is in turn based on only a single performance attribute, $A_1$, that is governed only by a single CC. As a result, system-wide 100 compliance with the SLA is determined solely by the performance of this single CC in respect of $A_1$.

Accordingly, there is a probability, P, of the CU complying with the SLA; as represented by the following notation:

$$P(\text{pass}, SLA(A_1)).$$

$P(\text{pass}; SLA(A_1))$ is taken to be a function of:

1. a number of times that the SLA is expected to fail in relation to $A_1$, for example as calculated by considering the Mean Time To Failure (MTTF) within a time period of interest, $t_F$, over which compliance with the SLA is assessed; and
2. a time required to recover to an SLA-compliant state following a breach of the SLA in relation to $A_1$, herein referred to as a Mean Time To Recover (MTTR).

Typically, constant adherence with a performance requirement is not required in order to meet the SLA. Instead, overall adherence with a performance requirement is assessed over the time period of interest, $t_F$. As a result, instantaneous (relative to $t_F$) underperformance of a performance requirement is tolerable for SLA compliance; it is for this reason that the MTTR forms a component of the function $P(\text{pass}; SLA(A_1))$.

The time period of interest, $t_F$, is defined within the SLA and is available to be of the order of minutes, hours, days, months or years. The time period of interest is available to vary for each performance attribute of the SLA.

In one example, the MTTF is modelled to a Poissonian distribution, which is appropriate given that the MTTF is a discrete distribution (i.e. counting the number of occurrences of an event, i.e. SLA breaches).

$Q(k; \lambda_F, t_F)$ is the probability of observing k number of SLA breaches (i.e. the single CC of this example failing to comply with a performance requirement associated with $A_1$) within the time period of interest, $t_F$, and the average expected number of SLA breaches is provided by $r_F=1/\lambda_F$, where $\lambda_F$ is a rate parameter of SLA breaches. Accordingly, $$Q(k; \lambda_F, t_F) \sim \text{Poisson}(\lambda_F, t_F),$$

and so, $$Q(k; \lambda_F, t_F) \sim \frac{e^{-t_F\lambda_F}(\lambda_F t_F)^k}{k!}.$$

From the distribution $Q(k; \lambda_F, t_F)$, a sample integer number of SLA breaches is taken, and this sample is denoted K.

In this example, the MTTR is modelled according to an exponential distribution given that the duration of events occur around a mean duration. Accordingly, the expected duration taken to recover from an SLA breach, $G(t_F; 1, \lambda_B)$, follows:

$$G(t_F; 1, \lambda_B) \sim \Gamma(1, \lambda_B),$$

which is a gamma distribution, F, with a shape parameter of 1 and a scale parameter, $\lambda_B$, of 1/MTTR. Accordingly, $$G(t_F; 1, \lambda_B) \sim \lambda_B e^{-\lambda_B t_F}.$$

For the time period of interest, $t_F$, the expected total duration of SLA breaches, U, is given by a compound function of the MTTF and MTTR probability distributions, such that:

$$U = P(t_F; G \mid Q).$$

A specific eventuality is taken in which there are K instances of SLA breaches; in this circumstance, the expected total duration of SLA breaches, U, may therefore be taken to be:

$$U = \sum_{j=1}^{j=k} G_j,$$

in which j is an index number of an instance of an individual SLA breach. That is, the total duration of SLA breaches, U, is a summation of the time required to recover to an SLA-compliant state following a total of K instances of SLA breach. This equation derives a value for the expected total duration of an SLA breach only in the single specific situation of there having been exactly K number of failures. By iteratively calculating U for a sufficiently large number of values for K, m, a long-term average for the expected total duration of SLA breaches is available to be derived.

In this example, the system-wide 100 probability of complying with the SLA, $P(\text{pass}; SLA)$ (which, in this example, is equivalent to $P(\text{pass}; SLA(A_1))$, given that the SLA consists of a performance requirement based only on $A_1$) is calculated as one less than a count of the number of occasions of SLA breaches within $t_F$, $[U_1; \text{SLA breach}]$, divided by the total number of sets of samples, m:

$$P(\text{pass}; SLA) = 1 - \frac{1}{m}\sum_{l=1}^{l=m}[U_l; SLA \text{ breach}], \qquad \text{Eq. 1}$$

where l is an index number for each value of K, and where m>1.

With reference to FIG. 2, all (seven) of the CCs 210 perform operations that are consequential to performance attribute $A_1$. As a result, all of the CCs are responsible for helping ensure compliance with the SLA in respect of performance attribute $A_1$; this set of CCs is denoted as Z, such that:

$$Z=\{z_1, z_2, \ldots z_n\},$$

where $z_1$ is the first CC 210-1, and so on, and where n=7.

A distribution for P(pass; SLA($A_1$)) is available to be generated at step 340 of process 300, which is determined by means of the MS 150 for the CUs 130 comprised within set Z; this is determined using Equation 1 above across the set Z, and combining the calculated probabilities (i.e. determining a product of the probabilities for CCs in set Z, given that they are conditionally dependent).

In the example of FIG. 2, P(pass; SLA($A_1$)) is the product of the values of Equation 1 for each CC constituent of set Z.

In this way, there is calculated a probability of the SLA being met for a performance requirement that is dependent on performance attribute $A_1$ based on performance information from each CC; this overall probability accounts for conditions where individual CCs themselves may fail to operate as required (as determined based on retrieve performance information, as per step 320 of process 300), but where the overall SLA is still met. That is, there is provided by the MS an analytical system that is capable of calculating the probability of SLA compliance upon condition of failure of any of the CCs.

As per step 360 of process 300, an overall probability of compliance with the SLA as a whole (i.e. for all performance requirements for all performance attributes) is calculated by performing the probabilistic analysis described above for each performance attribute of the SLA.

The examples described assume an equal weighting of relationships between the CCs 130. However, typically, each CC that depends on another, earlier, CC may not necessarily have the same level of reliance on that earlier CC; this level of reliance is referred to as a relational weight, W. Accordingly, a relational weight value is determined and assigned to each relationship (in each direction, as applicable) between CCs.

For a given performance attribute, there is provided an overall system relational weight, $W_{system,z}$, which is the probability that the CU fails to comply with the SLA (for that performance attribute) given that CC z fails to perform to a predetermined threshold (e.g. as determined by a performance requirement of the SLA or as otherwise prescribed).

In addition, there is also provided an relational weight amongst dependent CCs, $W_{y,z}$, which is the probability that CC y fails to comply with the SLA (for that performance attribute) given that CC z fails to perform to the predetermined threshold.

With this, the probability of the CU complying with the SLA for a given performance attribute, in dependence on non-homogenous relational weights, and given that CC z fails to perform to the predetermined threshold, is denoted as:

$$P(\text{pass}; (SLA) \mid z \text{ fail}) = P(z \text{ fail})(1-W_{system,z}) \prod_{y=1, y\neq z}^{y=l} (1-W_{y,z}),$$

where P(z fail) is the probability that CC z fails to perform to the predetermined threshold, and where y={1, . . . , l} is the set of all CCs that depend from CC z (therefore y≠z).

Accordingly, by considering relational weights, there is provided a model that more accurately reflects the non-homogeneity of the relationships between the CCs for delivering the computational service. Therefore, this model may allow more accurately to determine the probability of an upcoming SLA breach based on the current performance of CCs.

Initial values for relational weight for each CC are available to be prescribed and then iteratively adjusted by the MS.

Based on the relational weight, an importance value is derived to indicate the influence of any given CC as to its effect on a given performance attribute, and therefore the influence in ensuring compliance with the SLA for that performance attribute. As such, the importance value, I, represents how impactful a given CC is for passing the SLA for a given performance attribute. More formally, the importance value, for a given performance attribute, may be defined as the probability that the overall system fails to meet the SLA because of the performance of that CC. The importance value for CC z is:

$$I_Z = 1 - P(\text{pass}; (SLA) \mid z \text{ fail}).$$

The importance of the first CC 210-1, $I_1$, represents both the importance of its own processing to help pass the SLA, but also how important the output of that processing is to ensure that subsequent CCs which depend from it also help pass the system SLA.

Figure 4:
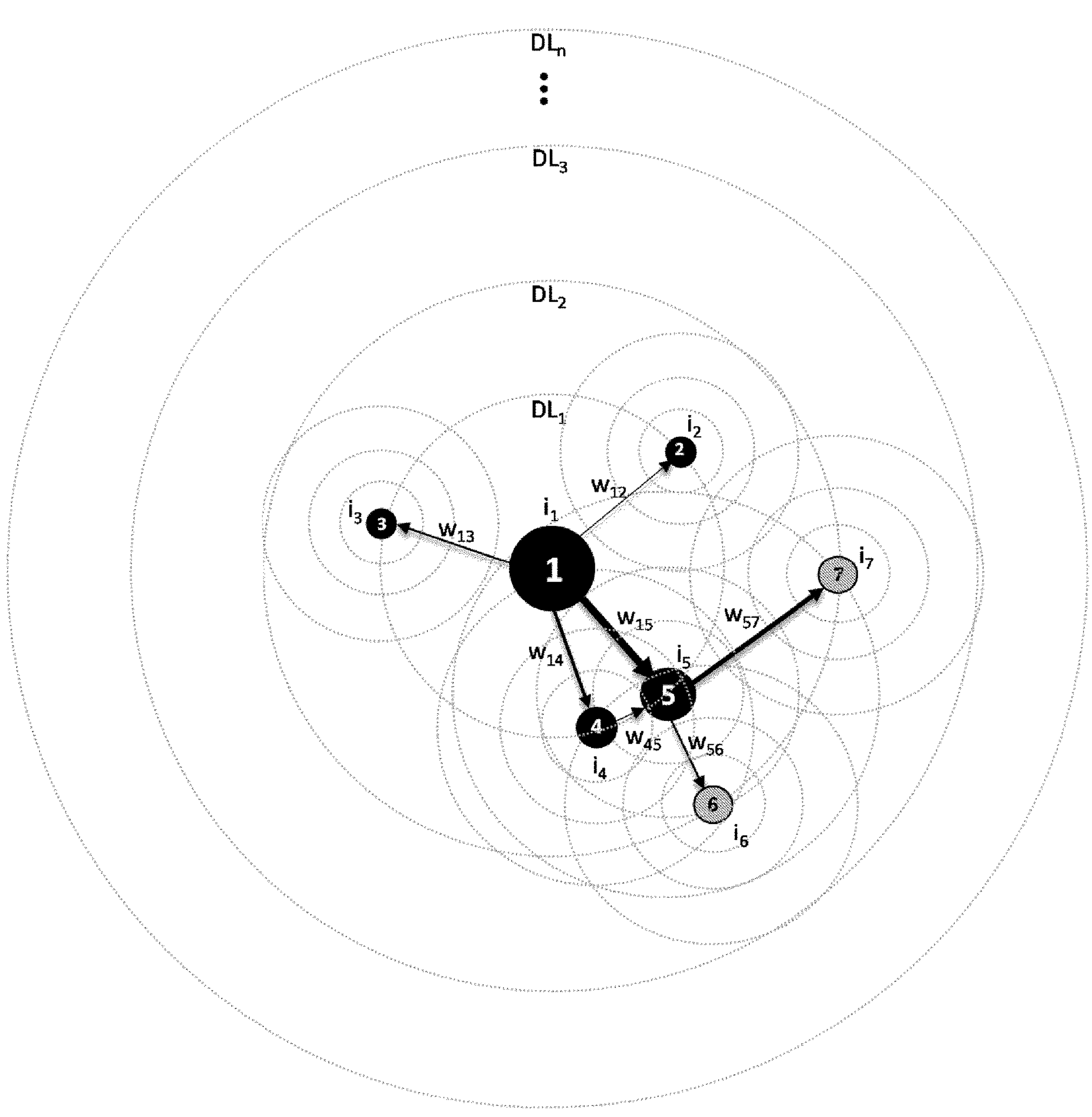
FIG. 4 is a plot showing relationships between components of the computational system.

FIG. 4 is a plot that visualises the importance and relational weight values for the CCs of FIG. 2. Specifically, radial distance represents the relative importance of a CC to the first CC 210-1, and line weights are proportional to values for relational weights between connected CCs.

With reference to FIG. 4, a CC that directly depends on the first CC 210-1 sits at a radius denoted by $DL_1$, which represents a highest level of importance and a direct and immediate relationship with the first CC (or a "first order" relationship). As a result, the second 210-2, third 210-3, fourth 210-4 and fifth 210-5 CCs lie at $DL_1$. Subsequently, the sixth and seventh CCs 210-6 and 210-7 sit at a radius denoted by $DL_2$, which represents an indirect relationship via on intermediate CC (i.e. the fifth 210-5 CC), or a "second order" relationship, with the first CC 210-1, and therefore the sixth and seventh CCs 210-6 and 210-7 are said to be less important than the remaining CCs.

The MS is therefore configured to ascertain importance and relational weight. In this way, the MS is capable of augmenting the information it receives regarding existence of a relationship between CCs, with quantitative information as to how important these relationships actually are. In turn, the MS is capable of better calculating the probability of compliance with the SLA given current performance information. Furthermore, the CU may be configured with importance values in mind, such as to ensure redundancy and resilience of CCs that have the highest importance values.

In one example, the computational system is available to be reconfigured (as initiated by the Service Provider 110, CU 130 or MS 150) so as to modify the operation of the CCs in dependence on the output of process 300.

For example, upon a determination that there is a significant risk of an SLA breach (see step 380-1 of process 300), the CCs are available to be reconfigured so as to help reduce the risk of an SLA breach. An example of such a reconfiguration includes increasing processing resources that are available to a computing component. Selection of CCs for reconfiguration is performed in a prioritised manner based on the importance and relational weight of the computing components.

In another example, upon a determination that there is an insignificant risk of an SLA breach (see step 380-2 of process 300), the CCs are available to be reconfigured so as to increase the risk of an SLA breach, but where such risk is still within the bounds of insignificancy. This is available to be performed, for example, so as to improve the efficiency of the allocation of processing resources in the CU. In effect, the computational system is provided with a process to reconfigure itself to an extent based on the risk of SLA breaches (or SLA-based orchestration), as determined using probabilistic analysis that is cognisant of the functional relationships between CCs and their importance and/or relational weight, but without needing to have knowledge of the actual function/s that is/are performed by any given CC.

Alternatives and Modifications

Whilst a particular quantitative methodology has been described above for determining the probability of SLA breaches, it will be appreciated that alternative methods exist that may be used within the scope of the invention.

In one example the network connections 140-1, 140-2 are in the form of: a wireless (wide or local area network); a fixed-line network; and/or a satellite network.

In one example, the Computing Unit 130 is comprised of a distributed arrangement of networked computing components, and in particular in the form of a cloud computing system and/or a telecommunications system.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of monitoring a computational system, said computational system comprising a plurality of interoperating computing components for performing computational operations thereby to provide a computational service to a user, wherein said computational system comprises a plurality of performance requirements based on at least one performance attribute, the method comprising the steps of:

selecting a performance attribute from the at least one performance attribute, the selected performance attribute being associated with a performance requirement from the plurality of performance requirements of the computational system;

identifying a set of computing components from the plurality of computing components, wherein each of the computing components in the set perform operations affecting the selected performance attribute;

determining a mapping of relationships for the computing components in the identified set in relation to the selected performance attribute, the mapping comprising a sequence in which operations are performed by the computing components and the mapping indicating a direction of a relationship between the computing components, the direction of the relationship between the computing components being a direction from an output of a first of the computing components provided to an input of a second of the computing components;

retrieving a performance status of a computing component in the identified set; and in dependence on said determined mapping and said retrieved performance status, calculating a probability of the identified set complying with the performance requirement for the selected performance attribute;

wherein the probability is calculated in dependence on:

a first distribution for an expected number of times that the identified set does not comply with the performance requirement within a predetermined time period; and a second distribution for an expected time required for the identified set to recover to a state that complies with the performance requirement having failed to comply with the performance requirement.

2. A method according to claim 1, wherein the probability is calculated in dependence on an expected total time in which the identified set does not comply with the performance requirement, and wherein said expected total time is an output from the second distribution based on an input of a sample value for an expected number of times that the identified set does not comply with the performance requirement from the first distribution.

3. A method according to claim 2, wherein the probability is calculated in dependence on a count of the number of times over a plurality of sample values from the first distribution when the expected total time exceeds an upper limit for a total time when the identified set does not comply with the performance requirement.

4. A method according to claim 1, wherein the probability is calculated in dependence on the retrieved performance status by:

comparing the retrieved performance status to a threshold performance status value;

determining that the performance status is below the threshold performance status value and therefore subsequently designating the computing component as having no effect on the selected performance attribute; and wherein the probability is calculated as a conditional probability of the identified set complying with the performance requirement when said computing component is designated to have no effect on the selected performance attribute.

5. A method according to claim 1, wherein the performance status is retrieved from each computing component of the identified set, and wherein said probability is calculated in dependence on the performance status from each computing component.

6. A method according to claim 1, further comprising the steps of:

comparing the determined probability to a threshold probability value;

outputting a determination that the computational system is likely to comply with the performance requirement when the determined probability exceeds the threshold probability value; and outputting a determination that the computational system is unlikely to comply with the performance requirement when the determined probability does not exceed the threshold probability value.

7. A method according to claim 6, the computational system is determined to be likely to comply with the performance requirement having designated the computing component to have no current effect on the selected performance attribute.

8. A method according to claim 6, further comprising the step of reconfiguring at least one of the computing components within the identified set in response to outputting a determination that the computational system is unlikely to comply with the performance requirement.

9. A method according to claim 1, further comprising the step of reconfiguring at least one of the computing components within the identified set so as to decrease the probability of the identified set complying with the performance requirement.

10. A method according to claim 1, further comprising the step of determining a relational weight value for each determined mapping of relationships, wherein the probability is calculated in dependence on said each relational weight value.

11. A method according claim 10, wherein the relational weight value is calculated for a relationship between a first computing component and a second computing component, and wherein said relational weight value is derived from a probability that the second computing component is capable of ensuring compliance with the performance requirement in the event that the performance status of the first computing component is below the threshold performance status value.

12. A method according to claim 10, further comprising the steps of:

deriving an importance value for a computing component within the identified set, wherein said importance value is one less than a product of the relational weight values associated with that computing component; and calculating the probability in dependence on the importance value.

13. A method according to claim 12, wherein a step of reconfiguring the at least one of the computing components is performed by selecting a computing component to reconfigure in dependence on its importance value.

14. A method according to claim 1, further comprising the step of repeating the method according to any preceding claim for a further performance attribute and/or for a further performance requirement of the computational system.

15. A non-transitory computer-readable storage medium comprising instructions that, when executed by a processor associated with a computational system, causes a telecommunication network to perform the method according to claim 1.

16. The method according to claim 1, wherein the first distribution is modelled to a Poissonian distribution and the second distribution is modelled to an exponential distribution.

17. An apparatus for monitoring a computational system, the computational system including a plurality of interoperating computing components for performing computational operations thereby to provide a computational service to a user, and the computational system including a plurality of performance requirements based on at least one performance attribute, the apparatus comprising a processor and a non-transitory computer-readable storage medium storing instructions that, when executed by the processor, causes the apparatus to at least be configured to:

select a performance attribute from the at least one performance attribute, the selected performance attribute being associated with a performance requirement from the plurality of performance requirements of the computational system;

identify a set of computing components from the plurality of computing components, wherein each of the computing components in the set perform operations affecting the selected performance attribute;

determine a mapping of relationships for the computing components in the identified set in relation to the selected performance attribute, the mapping comprising a sequence in which operations are performed by the computing components and the mapping indicating a direction of a relationship between the computing components, the direction of the relationship between the computing components being a direction from an output of a first of the computing components provided to an input of a second of the computing components;

retrieve a performance status of a computing component in the identified set; and in dependence on the determined mapping and the retrieved performance status, calculate a probability of the identified set complying with the performance requirement for the selected performance attribute;

wherein the probability is calculated in dependence on;

a first distribution for an expected number of times that the identified set does not comply with the performance requirement within a predetermined time period; and a second distribution for an expected time required for the identified set to recover to a state that complies with the performance requirement having failed to comply with the performance requirement.

18. The apparatus according to claim 17, wherein the probability is calculated in dependence on an expected total time in which the identified set does not comply with the performance requirement, and wherein said expected total time is an output from the second distribution based on an input of a sample value for an expected number of times that the identified set does not comply with the performance requirement from the first distribution.

19. The apparatus according to claim 18, wherein the probability is calculated in dependence on a count of the number of times over a plurality of sample values from the first distribution when the expected total time exceeds an upper limit for a total time when the identified set does not comply with the performance requirement.

20. The apparatus according to claim 17, wherein the first distribution is modelled to a Poissonian distribution and the second distribution is modelled to an exponential distribution.

* * * * *